United States Patent
Cruickshank et al.

(10) Patent No.: US 9,552,917 B2
(45) Date of Patent: Jan. 24, 2017

(54) MATERIALS, DEVICES AND METHODS RELATED TO BELOW-RESONANCE RADIO-FREQUENCY CIRCULATORS AND ISOLATORS

(71) Applicant: SKYWORKS SOLUTIONS, INC., Woburn, MA (US)

(72) Inventors: David Bowie Cruickshank, Rockville, MD (US); Iain Alexander MacFarlane, Midleton (IE); Michael David Hill, Frederick, MD (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/488,205

(22) Filed: Sep. 16, 2014

(65) Prior Publication Data
US 2015/0130550 A1    May 14, 2015

Related U.S. Application Data

(60) Provisional application No. 61/880,276, filed on Sep. 20, 2013.

(51) Int. Cl.
| | |
|---|---|
| H01F 10/24 | (2006.01) |
| H01P 1/387 | (2006.01) |
| C04B 35/26 | (2006.01) |
| H01F 1/34 | (2006.01) |
| C01G 49/00 | (2006.01) |
| H01F 1/01 | (2006.01) |
| H01P 1/38 | (2006.01) |

(52) U.S. Cl.
CPC ........... *H01F 10/24* (2013.01); *C01G 49/0018* (2013.01); *C01G 49/0054* (2013.01);
(Continued)

(58) Field of Classification Search
CPC ................. H01F 10/24; H01P 1/387
(Continued)

(56) References Cited

U.S. PATENT DOCUMENTS 3,429,740 A * 2/1969 Mee ................ C04B 35/2675
257/183
4,544,239 A * 10/1985 Shone ................ G02F 1/0036
252/583
(Continued)

FOREIGN PATENT DOCUMENTS

| JP | 2003168902 A | 6/2003 |
|---|---|---|
| JP | 2006044964 A | 2/2006 |

(Continued)

*Primary Examiner* — Dean Takaoka
*Assistant Examiner* — Alan Wong
(74) *Attorney, Agent, or Firm* — Chang & Hale LLP

(57) ABSTRACT

Materials, devices and methods related to below-resonance radio-frequency (RF) circulators and isolators. In some embodiments, a circulator can include a conductor having a plurality of signal ports, and one or more magnets configured to provide a magnetic field. The circulator can further include one or more ferrite disks implemented relative to the conductor and the one or more magnets so that an RF signal can be routed selectively among the signal ports due to the magnetic field. Each of the one or more ferrite disks can include synthetic garnet material having dodecahedral sites, octahedral sites and tetrahedral sites, with bismuth (Bi) occupying at least some of the dodecahedral sites, and aluminum (Al) occupying at least some of the tetrahedral sites. Such synthetic garnet material can be represented by a formula $Y_{3-x-2y-z}Bi_xCa_{2y+z}Fe_{5-y-z-a}V_yZr_zAl_aO_{12}$. In some embodiments, $x \leq 1.4$, $y \leq 0.7$, $z \leq 0.7$, and $a \leq 0.75$.

19 Claims, 12 Drawing Sheets

(52) U.S. Cl.
CPC ............... *C04B 35/26* (2013.01); *H01F 1/01* (2013.01); *H01F 1/346* (2013.01); *H01P 1/38* (2013.01); *C01P 2002/70* (2013.01); *C01P 2006/40* (2013.01); *C01P 2006/42* (2013.01); *C04B 2235/3208* (2013.01); *C04B 2235/3217* (2013.01); *C04B 2235/3225* (2013.01); *C04B 2235/3239* (2013.01); *C04B 2235/3244* (2013.01); *C04B 2235/3298* (2013.01); *C04B 2235/764* (2013.01)

(58) Field of Classification Search
USPC .......................................... 333/1.1; 252/62.57
See application file for complete search history.

(56) References Cited

U.S. PATENT DOCUMENTS

| | | | |
|---|---|---|---|
| 4,904,965 A * | 2/1990 | Blight | H01P 1/387 333/1.1 |
| 5,603,098 A * | 2/1997 | Kwan | H01Q 23/00 333/1.1 |
| 6,433,649 B2 * | 8/2002 | Miura | 333/1.1 |
| 6,800,577 B2 * | 10/2004 | Mailadil | C04B 35/462 333/219.1 |
| 8,183,952 B2 * | 5/2012 | Bunce | H01P 1/387 333/1.1 |
| 2009/0260861 A1 * | 10/2009 | Nakajima | C04B 35/2675 174/257 |
| 2012/0133452 A1 | 5/2012 | Cruickshank et al. | |
| 2015/0044751 A1 * | 2/2015 | Chiou | C12M 35/02 435/173.6 |

FOREIGN PATENT DOCUMENTS

| | | |
|---|---|---|
| JP | 2007145705 A | 6/2007 |
| JP | 2010083689 A | 4/2010 |
| JP | 2011073937 A | 4/2011 |
| WO | 2012170259 A2 | 12/2012 |

* cited by examiner

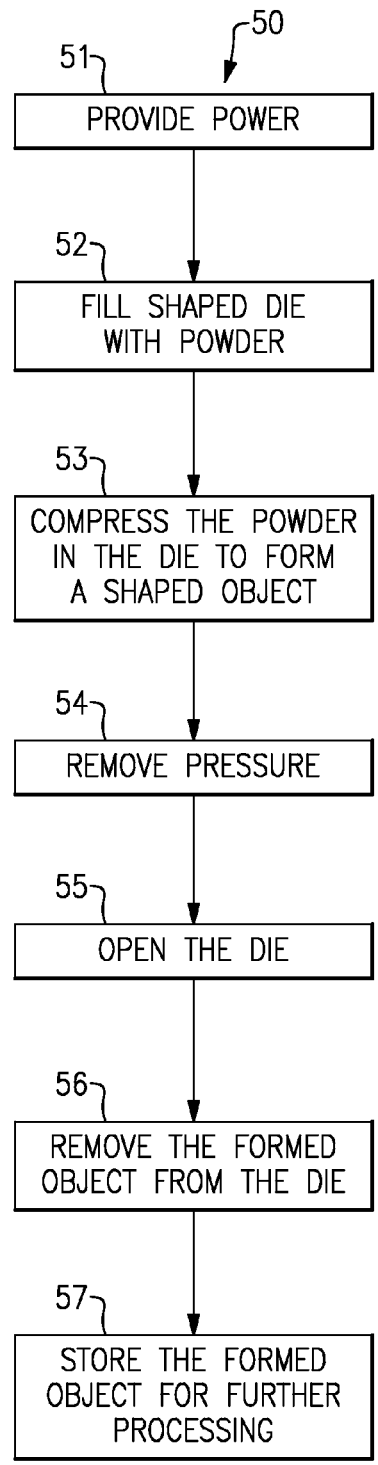
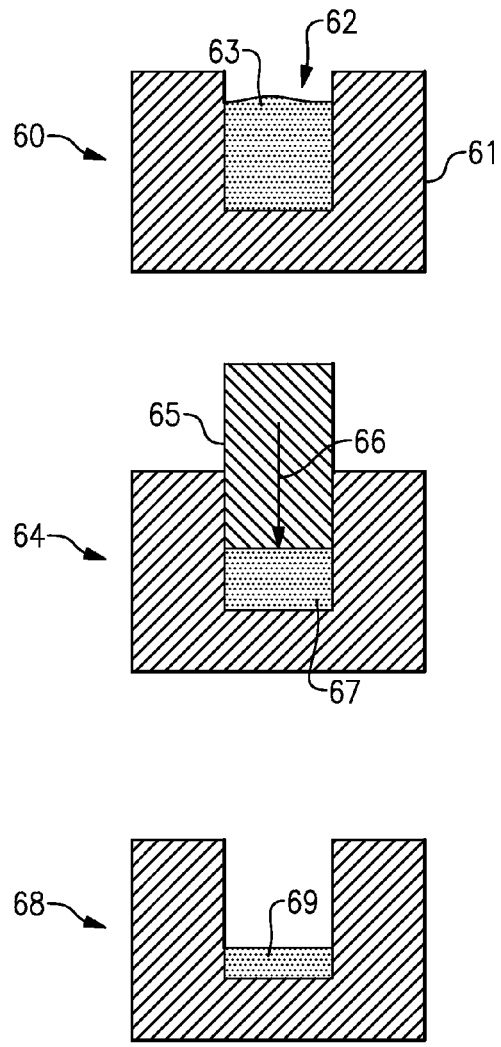
FIG.14
FIG.13

MATERIALS, DEVICES AND METHODS RELATED TO BELOW-RESONANCE RADIO-FREQUENCY CIRCULATORS AND ISOLATORS

CROSS-REFERENCE TO RELATED APPLICATION(S)

This application claims priority to U.S. Provisional Application No. 61/880,276 filed Sep. 20, 2013, entitled MATERIALS, DEVICES AND METHODS RELATED TO BELOW-RESONANCE RADIO-FREQUENCY CIRCULATORS AND ISOLATORS, the disclosure of which is hereby expressly incorporated by reference herein in its entirety.

BACKGROUND

Field

The present disclosure generally relates to materials, devices and methods related to below-resonance radio-frequency circulators and isolators.

Description of the Related Art

Various crystalline materials with magnetic properties are used as components in radio-frequency (RF) applications. Garnets are crystalline materials with ferrimagnetic properties particularly useful in RF electronics. Many RF magnetic materials are derivatives of Yttrium Iron Garnet (YIG), a synthetic form of garnet widely used in various telecommunication devices. YIG is generally composed of Yttrium, Iron, Oxygen, and possibly doped with one or more other rare earth metals such as the Lanthanides or Scandium.

SUMMARY

According to a number of implementations, the present disclosure relates to a material having a structure including dodecahedral sites, octahedral sites and tetrahedral sites. Bismuth (Bi) occupies at least some of the dodecahedral sites, and aluminum (Al) occupies at least some of the tetrahedral sites.

In some embodiments, the octahedral sites can be substantially free of aluminum. In some embodiments, the material can have a dielectric constant value that is at least 25. In some embodiments, the material can have a 3-db ferrimagnetic resonance linewidth value that is less than 50 Oersted. In some embodiments, the material can have a saturation magnetization value in a range of 400 to 1000 Gauss.

In some embodiments, the material can be a synthetic garnet material represented by the formula $Y_{3-x-2y-z}Bi_x Ca_{2y+z}Fe_{5-y-z-a}V_y Zr_z Al_a O_{12}$, where Y, Bi, Ca, Fe, V, Zr, Al and O represent yttrium, bismuth, calcium, iron vanadium, zirconium, aluminum and oxygen, respectively. The quantity x can be less than or equal to 1.4. The quantity y can be less than or equal to 0.7. The quantity z can be less than or equal to 0.7. The quantity a can be less than or equal to 0.75.

According to some teachings, the present disclosure relates to a method for fabricating synthetic garnet material having dodecahedral sites, octahedral sites, and tetrahedral sites. The method includes introducing bismuth (Bi) into at least some of the dodecahedral sites. The method further includes introducing aluminum (Al) into at least some of the tetrahedral sites.

In some implementations, the present disclosure relates to a circulator that includes a conductor having a plurality of signal ports, and one or more magnets configured to provide a magnetic field. The circulator further includes one or more ferrite disks implemented relative to the conductor and the one or more magnets so that a radio-frequency (RF) signal is routed selectively among the signal ports due to the magnetic field. Each of the one or more ferrite disks includes a synthetic garnet material having dodecahedral sites, octahedral sites and tetrahedral sites, with bismuth (Bi) occupying at least some of the dodecahedral sites, and aluminum (Al) occupying at least some of the tetrahedral sites.

In some embodiments, the garnet material can be represented by the formula $Y_{3-x-2y-z}Bi_x Ca_{2y+z}Fe_{5-y-z-a}V_y Zr_z Al_a O_{12}$, where Y, Bi, Ca, Fe, V, Zr, Al and O represent yttrium, bismuth, calcium, iron vanadium, zirconium, aluminum and oxygen, respectively. In some embodiments, substantially all of aluminum can occupy a number of tetrahedral sites, the number corresponding to the quantity a. The quantity a can be less than or equal to 0.75.

In some embodiments, the conductor can include a plurality of impedance transformers corresponding to the plurality of signal ports, with each impedance transformer including a stripline transmission line. In some embodiments, the circulator can further include a dielectric body implemented about the stripline transmission lines. The dielectric body can include a dielectric constant, and each stripline transmission line can have a physical length that is proportional to one over the square root of the dielectric constant of the dielectric body. In some embodiments, the dielectric body can have a dielectric constant in a range of 30 to 50.

In some embodiments, each ferrite disk can be a circular shaped disk. Each ferrite disk can have a dielectric constant value that is at least 25. Each ferrite disk can have a 3-db ferrimagnetic resonance linewidth value that is less than 50 Oersted. Each ferrite disk can have a saturation magnetization value in a range of 400 to 1000 Gauss.

In some embodiments, the circulator can be a below-resonance device. In some embodiments, the circulator can be an octave bandwidth device.

According to some implementations, the present disclosure relates to a packaged circulator module that includes a mounting platform configured to receive one or more components thereon. The packaged circulator module further includes a circulator device mounted on the mounting platform. The circulator device includes a conductor having a plurality of signal ports. The circulator device further includes one or more magnets configured to provide a magnetic field. The circulator device further includes one or more ferrite disks disposed relative to the conductor and the one or more magnets so that a radio-frequency (RF) signal is routed selectively among the signal ports due to the magnetic field. Each of the one or more ferrite disks includes a synthetic garnet material having dodecahedral sites, octahedral sites and tetrahedral sites, with bismuth (Bi) occupying at least some of the dodecahedral sites, and aluminum (Al) occupying at least some of the tetrahedral sites. The packaged circulator module further includes a housing mounted on the mounting platform and dimensioned to substantially enclose and protect the circulator device.

According to a number of implementations, the present disclosure relates to a radio-frequency (RF) circuit board that includes a circuit substrate configured to receive a plurality of components. The RF circuit board further includes a plurality of circuits implemented on the circuit substrate and configured to process RF signals. The RF circuit board further includes a circulator device implemented on the circuit substrate and interconnected with at least some of the circuits. The circulator device includes a conductor having a plurality of signal ports. The circulator device further includes one or more magnets configured to provide a magnetic field. The circulator device further includes one or more ferrite disks disposed relative to the conductor and the one or more magnets so that a radio-frequency (RF) signal is routed selectively among the signal ports due to the magnetic field. Each of the one or more ferrite disks includes a synthetic garnet material having dodecahedral sites, octahedral sites and tetrahedral sites, with bismuth (Bi) occupying at least some of the dodecahedral sites, and aluminum (Al) occupying at least some of the tetrahedral sites. The RF circuit board further includes a plurality of connection features configured to facilitate passing of the RF signals to and from the RF circuit board.

In some implementations, the present disclosure relates to a radio-frequency (RF) system that includes an antenna assembly configured to facilitate transmission and reception of RF signals. The RF system further includes a transceiver interconnected to the antenna assembly and configured to generate a transmit signal for transmission by the antenna assembly and process a received signal from the antenna assembly. The RF system further includes a front end module configured to facilitate routing of the transmit signal and the received signal. The front end module includes one or more circulators. Each circulator includes a conductor having a plurality of signal ports. The circulator further includes one or more magnets configured to provide a magnetic field. The circulator further includes one or more ferrite disks disposed relative to the conductor and the one or more magnets so that at least some of the RF signals is routed selectively among the signal ports due to the magnetic field. Each of the one or more ferrite disks includes a synthetic garnet material having dodecahedral sites, octahedral sites and tetrahedral sites, with bismuth (Bi) occupying at least some of the dodecahedral sites, and aluminum (Al) occupying at least some of the tetrahedral sites.

In some embodiments, the circulator can be configured to operate in a below-resonance region. In some embodiments, the circulator can be configured to operate with an octave bandwidth. In some embodiments, the RF system can be implemented in a base station such as a cellular base station. In some embodiments, the RF system can be implemented in a portable wireless device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 13 shows a process that can be implemented to form a shaped object from the powder material of FIG. 12.

FIG. 14 shows examples of various stages of the process of FIG. 13.

DETAILED DESCRIPTION OF SOME EMBODIMENTS

Figure 1:
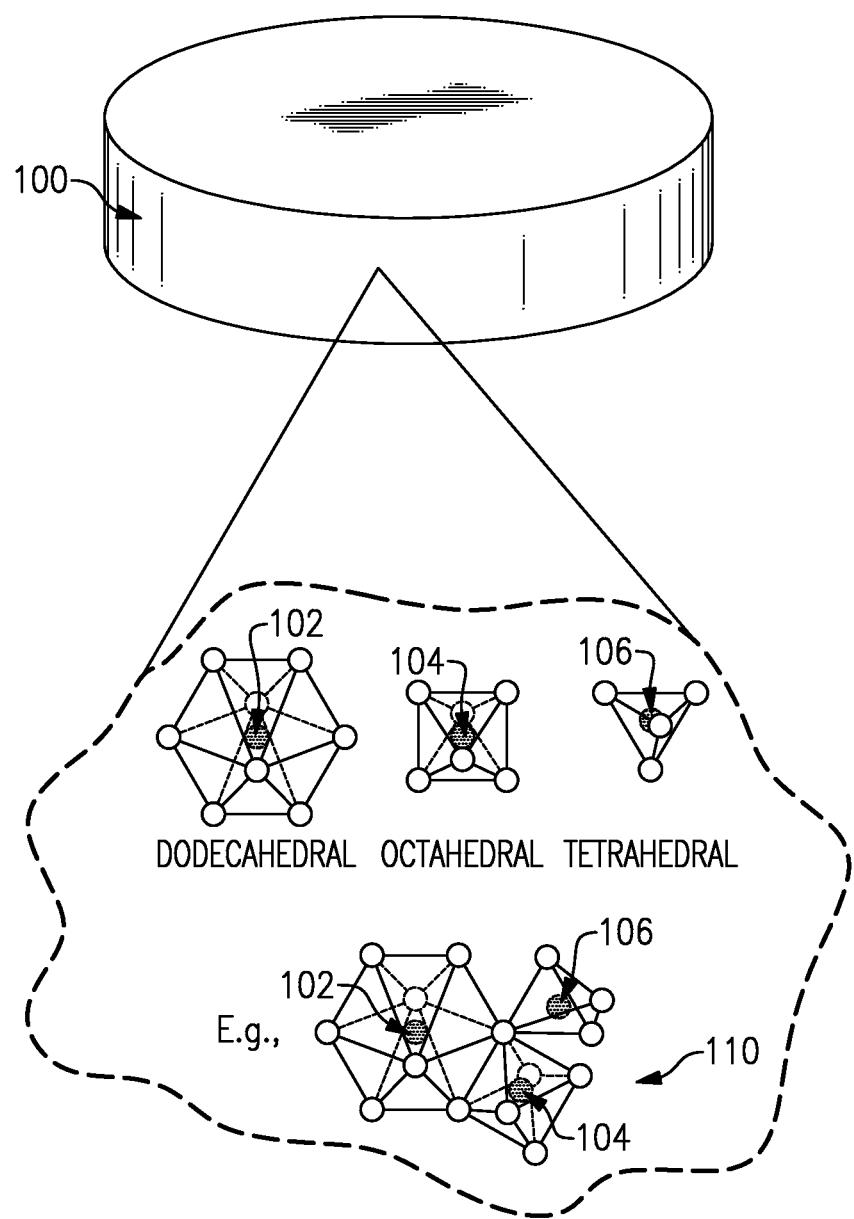
FIG. 1 shows an example ferrite device having one or more garnet features as described herein.

The headings provided herein, if any, are for convenience only and do not necessarily affect the scope or meaning of the claimed invention.

Disclosed herein are materials, devices and methods related to synthetic garnet compositions, such as Yttrium Iron Garnet (YIG), having one or more desirable features that can be utilized in, for example, radio-frequency (RF) applications. Such desirable features can include, but are not limited to, high dielectric constant, low linewidth (e.g., 3 dB-linewidth) and low saturation magnetization.

In some embodiments, materials having such features can be implemented in below-resonance devices having reduced dimensions and relatively high bandwidth (e.g., octave bandwidth). Examples of such devices are described herein in greater detail. Although described in such a context of below-resonance devices, it will be understood that one or more features of the present disclosure can also be implemented in other types of devices.

Conventional below-resonance devices such as octave bandwidth below-resonance devices are typically large, and therefore are not used in applications such as cellular transceivers. A below-resonance device typically includes various components that contribute to size. For example, ferrite material can yield a ferrite device size that is determined by the wave length of an equivalent transverse magnetic (TM) mode resonator. In another example, an impedance transformer (e.g., quarter wavelength) can have a physical length that is determined by one over the square root of the dielectric constant of material about a stripline transmission line.

In some embodiments, the length of such an impedance transformer can be reduced by, for example, use of materials having dielectric constants that are much higher than typical values (e.g., about 16) currently utilized in conventional below-resonance devices. For example, materials having dielectric constant values in a range of 20 to 50 and higher can be utilized. By way of non-limiting examples, such materials can include Trans-Tech's Magnesium Calcium Titanate series of materials (e.g., MCT-20 to MCT-50+), Trans-Tech's barium tetratitanate/nonatitanate based series of materials (e.g., 8812 and substituted 8300 series), and Trans-Tech's alpha PbO structure based 4500/4300 materials. Other dielectric constant values can also be utilized.

In some embodiments, the foregoing ferrite device size can be reduced by utilizing one or more techniques described in U.S. Application Publication No. US 2013/0050041, entitled "RARE EARTH REDUCED GARNET SYSTEMS AND RELATED MICROWAVE APPLICATIONS," which is expressly incorporated by reference in its entirely, and its disclosure is to be considered part of the specification of the present application. Such techniques can yield ferrite devices having reduced size. For example, for a disk shaped ferrite device operating at a fixed frequency and magnetic bias, the radius of the disk is inversely proportional to the square root of the ferrite's dielectric constant. Thus, a high dielectric constant (e.g., at least 21) can yield a reduced-dimension for the ferrite.

The foregoing techniques can also yield ferrite devices having relatively low ferrimagnetic resonance linewidth values. For example, linewidth values that are less than 12 Oersted can be obtained. Described herein are examples of how such reduced-size ferrite devices having reduced linewidth can be implemented in a below-resonance region. For example, in addition to the high dielectric constant and the low linewidth features, a relatively low saturation magnetization can be desirable for below-resonance operation.

FIG. 1 shows a ferrite device 100 having garnet structure and chemistry, and thus a plurality of dodecahedral structures, octahedral structures, and tetrahedral structures. The device 100 can include garnet structures (e.g., a garnet structure 110) formed from such dodecahedral, octahedral, and tetrahedral structures. Disclosed herein are various examples of how dodecahedral sites 102, octahedral sites 104, and tetrahedral sites 106 can be filled by or substituted with selected ions to yield one or more desirable properties for the ferrite device 100. Such properties can include, but are not limited to, high or increased dielectric constant, low or reduced saturation magnetization, and low or reduced linewidth.

In some embodiments, some or all of the foregoing properties desirable for below-resonance devices can be implemented by a modified synthetic garnet composition which can be represented by a formula $$Y_{3-x-2y-z}Bi_xCa_{2y+z}Fe_{5-y-z-a}V_yZr_zAl_aO_{12}, \quad (1)$$

where Y, Bi, Ca, Fe, V, Zr, Al and O represent yttrium, bismuth, calcium, iron vanadium, zirconium, aluminum and oxygen, respectively. In some embodiments, x can be less than or equal to 1.4, y can be less than or equal to 0.7, z can be less than or equal to 0.7, and a can be less than or equal to 0.75. A more specific example of the foregoing formula is described herein in greater detail.

The foregoing garnet is an example of a yttrium iron garnet (YIG, with a general formula of $Y_3Fe_2Fe_3O_{12}$) with various substitutions made at the dodecahedral (102 in FIG. 1), octahedral (104), and tetrahedral (106) sites. In the unmodified YIG ($Y_3Fe_2Fe_3O_{12}$) example, there are 8 sites (3 dodecahedral, 2 octahedral, and 3 tetrahedral sites) in a unit cell, with yttrium occupying the 3 dodecahedral sites, and iron occupying the 2 octahedral and 3 tetrahedral sites.

Various examples of how bismuth, calcium, vanadium and zirconium can substitute yttrium and iron in the various sites can be found in, for example, the above-referenced U.S. Application Publication No. US 2013/0050041. For example, un-substituted yttrium in an unmodified YIG has a formula unit of 3 (i.e., $Y_3$). Bismuth can replace some or all of yttrium in the dodecahedral sites to, for example, reduce or substantially eliminate the yttrium content and/or increase dielectric constant of the material. With such a substitution where bismuth replaces x formula units (i.e., $Bi_x$), yttrium's formula unit can decrease to 3-x (e.g., $Y_{3-x}$).

In another example, z formula units of zirconium can replace some of the iron in the octahedral sites to, for example, reduce the linewidth of the material. With such a substitution, iron's total formula unit of 5 (2 octahedral and 3 tetrahedral) can decrease to 5-z (e.g., $Fe_{5-z}$). In yet another example, y formula units of vanadium can replace some of the iron in the tetrahedral sites to, for example, reduce saturation magnetization and/or reduce the linewidth of the material. Assuming the foregoing substitution with zirconium, such a substitution with vanadium can result in the iron's formula unit being decreased to 5-y-z (e.g., $Fe_{5-y-z}$). In some embodiments, and as described herein, "a" formula units of aluminum can replace some the iron in tetrahedral sites to, for example, provide a combination of desirable features for below-resonance implementation of the material. Assuming the foregoing substitutions with zirconium and vanadium, such a substitution with aluminum can result in the iron's formula unit being decreased to 5-y-z-a (e.g., $Fe_{5-y-z-a}$).

In the foregoing example substitutions with zirconium and vanadium, valency imbalance resulting from such higher valency ions (4+ for zirconium, and 5+ for vanadium) can be compensated by introduction of calcium (valency of +2) into some of the dodecahedral sites. Such valency compensation can also further reduce the yttrium content of the material by substitution of yttrium in the dodecahedral sites with calcium. For example, for each 4+ ion (e.g., $Zr^{4+}$) introduced to an octahedral or tetrahedral site (e.g., zirconium in an octahedral site), one $Y^{3+}$ ion can be substituted with one $Ca^{2+}$ ion. For each 5+ ion (e.g., $V^{5+}$ in a tetrahedral site), two $Y^{3+}$ ions can be replaced by two $Ca^{2+}$ ions. For each 6+ ion, three $Y^{3+}$ ions can be replaced by three $Ca^{2+}$ ions. Thus, in the foregoing example of formula (1), the substitutions with $V_yZr_z$ can be valency-compensated with calcium content of 2y+z (e.g., $Ca_{2y+z}$). Accordingly, and assuming the substitution with bismuth as described herein, the substitution with calcium can decrease yttrium's formula unit to 3-x-(2y+z) (e.g., $Y_{3-x-2y-z}$).

Nonmagnetic ions at tetrahedral sites of a YIG can reduce the overall magnetization by reducing the influence of the tetrahedral sites over octahedral sites. Metals such as aluminum, gallium and vanadium are examples of materials that can be utilized to provide such nonmagnetic ions at the tetrahedral sites.

In the context of the aluminum example, introduction of aluminum in the tetrahedral sites can reduce magnetization in YIG from its value of approximately 1,780 gauss (unmodified YIG). Such a decrease in magnetization can be approximately linear as the aluminum content increases. After some threshold, aluminum can leak into the octahedral sites. At or near such a threshold, the rate of decrease in magnetization can change (e.g., decreases) as the aluminum content continues to increase. In the context of the unmodified YIG to which aluminum is introduced, such a threshold is typically at about 35% of iron in the tetrahedral sites. Relative to the overall iron formula unit of 5 (2 octahedral and 3 tetrahedral), such a threshold is typically at a formula unit of approximately 0.175.

As described herein, a modified synthetic garnet composition such as the example of formula (1) ($Y_{3-x-2y-z}Bi_x Ca_{2y+z}Fe_{5-y-z-a}V_yZr_zAl_aO_{12}$) can be configured to accept non-magnetic ions such as aluminum at the tetrahedral sites at a much higher level than the foregoing formula unit of 0.175 (e.g., of non-Bismuth-containing garnet materials) without leakage into the octahedral sites. As also described herein, such high aluminum content in the tetrahedral sites can be utilized to obtain desirable features for below-resonance implementation of the modified synthetic garnet. For example, in below-resonance devices configured to operate in a frequency range of about 0.5 GHz to 10 GHz or higher, a continuous distribution (e.g., a substantially linear distribution) of magnetization (4PiMs) in a range of 300 Gauss or lower to 1,800 Gauss or higher is required or desired. As described herein, such a desirable 4PiMs distribution can be achieved for below-resonance operation by substitution with aluminum at the tetrahedral sites.

Figure 2:
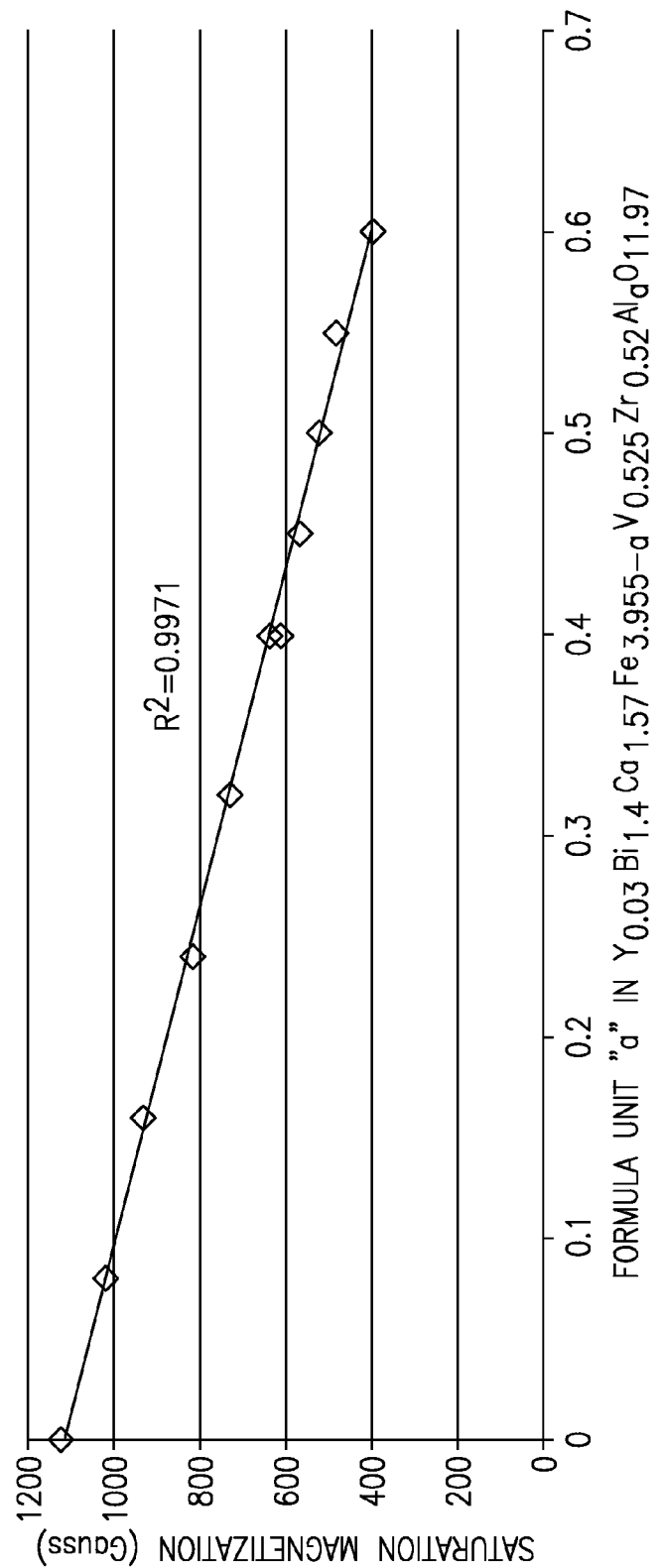
FIG. 2 shows a plot of saturation magnetization as a function of content formula unit of aluminum in an example Yttrium Iron Garnet (YIG), where aluminum occupies tetrahedral sites.
Figure 3:
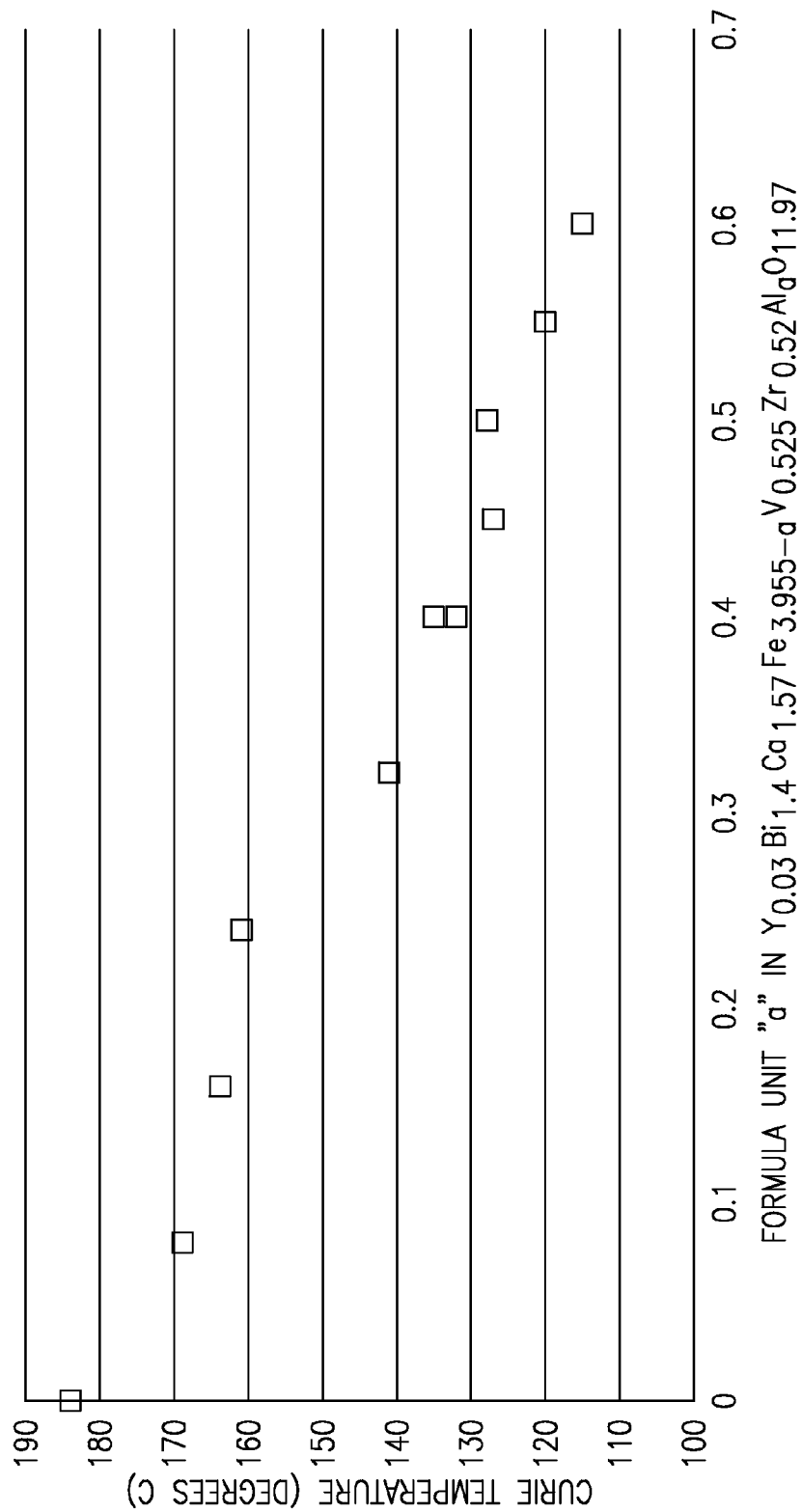
FIG. 3 shows a plot of Curie temperature as a function of content formula unit of aluminum in the example YIG of FIG. 2.
Figure 4:
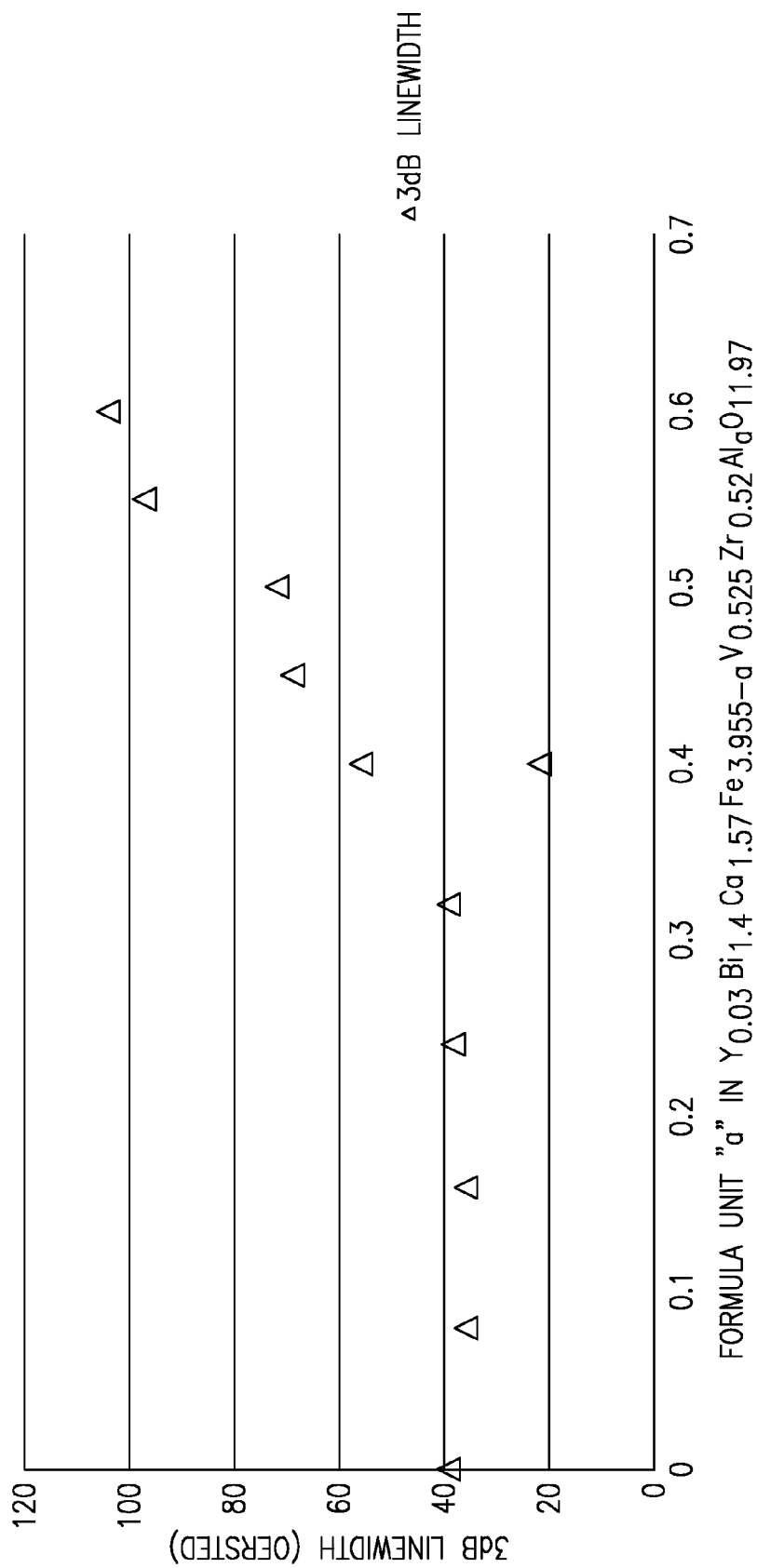
FIG. 4 shows a plot of ferrimagnetic resonance linewidth as a function of content formula unit of aluminum in the example YIG of FIG. 2.

FIGS. 2-4 show plots of measured saturation magnetization, Curie temperature, and 3-db linewidth for an example configuration of the modified synthetic garnet composition of formula (1) ($Y_{3-x-2y-z}Bi_xCa_{2y+z}Fe_{5-y-z-a}V_yZr_zAl_aO_{12}$). In the example configuration, x=1.4, y=0.525, and z=0.52, such that the formula becomes $Y_{0.03}Bi_{1.4}Ca_{1.57}Fe_{3.955-a}V_{0.525}Zr_{0.52}Al_aO_{11.97}$, with the formula unit "a" being variable. Table 1 lists approximate values associated with the data points shown in FIGS. 2-4.

TABLE 1

| Formula unit "a" | Measured saturation magnetization (Gauss) | Tc (degree C.) | 3-dB linewidth (Oersted) |
| --- | --- | --- | --- |
| 0 | 1126 | 184 | 39 |
| 0.08 | 1019 | 169 | 36 |
| 0.16 | 929 | 164 | 36 |
| 0.24 | 818 | 161 | 38 |
| 0.32 | 731 | 141 | 39 |
| 0.4 | 612 | 135 | 56 |
| 0.4 | 635 | 132 | 22 |
| 0.45 | 567 | 127 | 69 |
| 0.5 | 524 | 128 | 72 |
| 0.55 | 481 | 120 | 97 |
| 0.6 | 396 | 115 | 104 |

In FIG. 2, saturation magnetization values are plotted for various formula unit "a" values, with "a" ranging from zero to 0.6. A linear regression fit (solid line) shows that the decrease in saturation magnetization (as "a" increases) is highly linear, with a coefficient of determination ($R^2$) of 0.9971, at least up to and including a=0.6. It is believed that such a linear trend can continue to, for example, a value of "a" at 0.65, 0.7, 0.75, or possibly even higher. As described herein, such a linear trend can be representative of tetrahedral sites being substituted with aluminum. Further, in the example shown in FIG. 2, there is no indication of leakage of aluminum into octahedral sites.

In FIG. 3, Curie temperature values are plotted for various formula unit "a" values, with "a" ranging from zero to 0.6. The decrease in Curie temperature (as "a" increases) is generally linear, at least up to and including a=0.6. In the context of below-resonance operation, Curie temperature of, for example, at least 100 degrees C. or higher can be desirable.

In FIG. 4, 3-db linewidth values are plotted for various formula unit "a" values, with "a" ranging from zero to 0.6. One can see that the linewidth remains below 40 Oersted for 0.4 and lower values of "a." For a=0.4, the two linewidth values average to 39 Oersted which is below 40. For a>0.4, the linewidth value increases monotonically with "a."

In the context of below-resonance operation, 3-db linewidth of, for example 50 Oersted or lower can be desirable. For such an example, FIG. 4 shows that the example composition $Y_{0.03}Bi_{1.4}Ca_{1.57}Fe_{3.955-a}V_{0.525}Zr_{0.52}Al_aO_{11.97}$ can provide desired 3-db linewidth performance for the formula unit "a" up to and including approximately 0.4. In some applications, an upper limit of approximately 50 for the 3-db linewidth can be acceptable when magnetization (4PiMs) is less than approximately 1,000 Gauss. For values at and above 1,000 Gauss, higher values of 3-db linewidth may be permissible. For such a configuration, lanthanides series ions such as Gd+3 can be substituted into the dodecahedral sites. Such dodecahedral substitutions can provide, for example, weak spin lattice coupling, or relaxation, to minimize or reduce anisotropy and hence magnetic losses.

Figure 5:
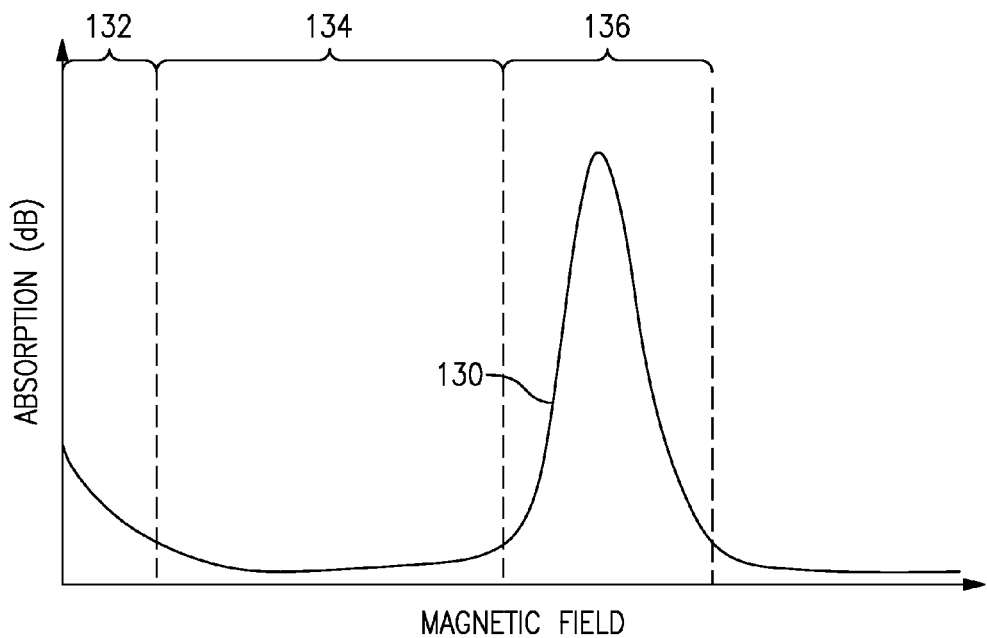
FIG. 5 shows that in some embodiments, a ferrite device having one or more features as described herein can be implemented in a below-resonance circulator device.

As described herein, a modified synthetic garnet composition such as the example of formula (1) can be implemented in a below-resonance ferrite device. FIG. 5 shows that in some embodiments, such a ferrite device can be implemented in a circulator; and such a circulator can be configured to provide a magnetic field in a region 134 corresponding to below-resonance operation. Such a region is typically between a low-field loss region 132 and a resonance region 136 where an absorption peak 130 resides.

For the foregoing below-resonance operation, the ferrite device of the circulator can have following properties. In some embodiments, dielectric constant of the ferrite device can have a value of, for example, at least 21, or in a range of 25 to 32. Examples of ferrites having such high dielectric constant values can be found in, for example, the above-referenced U.S. Application Publication No. US 2013/0050041.

In some embodiments, such ferrites having high dielectric constant values can be implemented as synthetic garnet material having a structure including dodecahedral sites, with Bismuth occupying at least some of the dodecahedral sites. Such garnet material can have a dielectric constant value of at least 21. In some embodiments, the dielectric constant value can be in a range of 25 to 32. In some embodiments, the garnet can include and/or be based on material that can be represented by the formula $Bi_{3-s}(RE$ or $Ca)_sFe_{2-t}(Me)_tFe_{3-u}(Me')_uO_{12}$ where s is greater than or equal to 1.6 and less than or equal to 2.0, RE represents a rare earth element, and each of Me and Me' represents a metal element. The value of s can be, for example, approximately 1.6. The metal element Me can include Zr and the value of t can be greater than or equal to 0.35 and less than or equal to 0.75. The value of t can be, for example, approximately 0.55. The metal element Me' can include V and the value of u can be greater than or equal to 0 and less than or equal to 0.525. The value of z can be, for example, approximately 0.525 such that the garnet is substantially free of rare earth and the formula is $Bi_{1.4}Ca_{1.6}Zr_{0.55}V_{0.525}Fe_{3.925}O_{12}$. For such an example composition, the dielectric constant value can be approximately 27. In some embodiments, the garnet material can have a ferrimagnetic resonance linewidth value that is less than, for example, 12 Oersted. Other linewidth values can also be implemented.

The foregoing synthetic garnet material having high dielectric constant can include dodecahedral sites, octahedral sites, and tetrahedral sites. Such garnet material can be fabricated by, for example, introducing Bismuth into at least some of the dodecahedral sites, introducing high-polarization ions into at least some of either or both of the octahedral and tetrahedral sites to yield a dielectric constant value of at least 21. In some embodiments, such high-polarization ions can include, for example, non-magnetic ions. Such non-magnetic ions can include Zirconium in octahedral sites in concentration selected to maintain a low magnetic resonance linewidth. The magnetic resonance linewidth can be less than or equal to, for example, 12 Oersted. Other linewidth values can also be implemented. In some embodiments, the non-magnetic ions can include Vanadium in tetrahedral sites.

In some embodiments, saturation magnetization of the ferrite device can have a value of, for example, 400 to 1150 Gauss, 400 to 1100 Gauss, 400 to 1000 Gauss, 400 to 900 Gauss, 400 to 800 Gauss, or 400 to 600 Gauss. In some embodiments, such reduced saturation magnetization can be obtained by aluminum substituting iron in the tetrahedral sites, and not in the octahedral sites, by a formula unit between 0 and 0.75, 0 and 70, 0 and 0.65, or 0 and 0.60. Examples of such substitutions and the resulting reduced saturation magnetization are described herein in reference to FIG. 2.

In some embodiments, 3-db linewidth (of ferrimagnetic resonance) of the ferrite device can have a value of, for example, 50 Oersted or less, or 40 Oersted or less. In some embodiments, such relatively low linewidth can be obtained or maintained by aluminum substituting iron in the tetrahedral sites by a formula unit between 0 and 0.40. Examples of such substitutions and the resulting linewidth performance are described herein in reference to FIG. 4.

Figure 6:
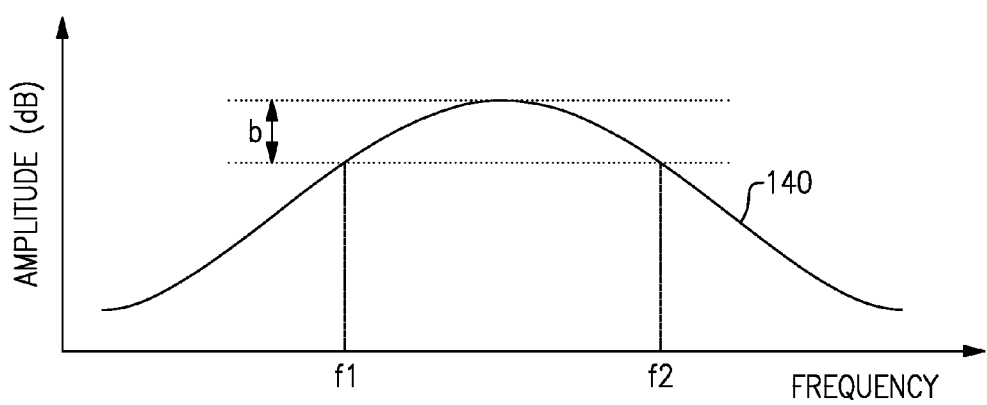
FIG. 6 shows that in some embodiments, the circulator of FIG. 5 can be configured to have a high bandwidth such as an octave bandwidth.

FIG. 6 shows that a circulator configured for below-resonance operation and having the foregoing properties for dielectric constant, saturation magnetization, and ferrimagnetic linewidth can have an effective bandwidth of f2−f1. Such a bandwidth can be based on a range of a frequency response curve 140, where lower and upper frequencies f1, f2 are at a level of "b" dB (e.g., 3 dB) from the peak amplitude (typically at a center frequency).

In some embodiments, a circulator having one or more features as described herein can have f2 that is at least 1.2 times f1, at least 1.5 times f1, at least 1.7 times f1, at least 1.8 times f1, at least 1.9 times f1, or at least 2 times f1 (e.g., an octave bandwidth). Other bandwidth configurations can also be implemented for below-resonance operations.

Figure 7A:
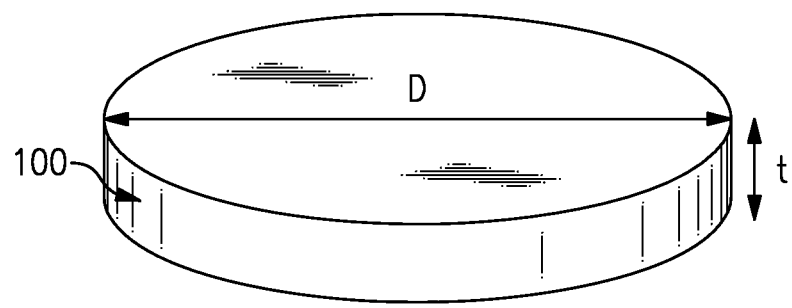
FIGS. 7A and 7B show that ferrite devices having one or more features as described herein can be implemented in different shapes.

As described herein, a ferrite device suitable for below-resonance implementation in a circulator can be configured to have reduced dimensions. FIG. 7A shows an example where such a ferrite device (100) has a cylindrical disk shape, with diameter D and thickness t. In some embodiments, either or both of the diameter and thickness can be reduced by use of a ferrite device having one or more features as described herein.

Figure 7B:
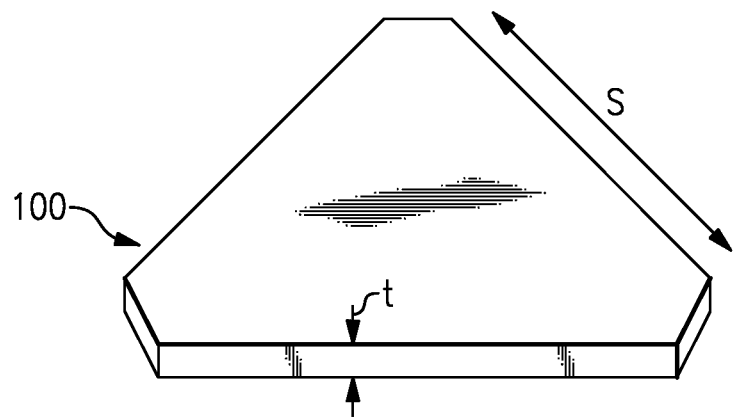

FIG. 7B shows that ferrite devices having one or more features as described herein can also be implemented in other shapes. For example, a triangular-shaped ferrite disk having a reduced side dimension of S and a thickness of d can be implemented. In some embodiments, either or both of the side and thickness dimensions can be reduced by use of a ferrite device having one or more features as described herein.

Figure 8:
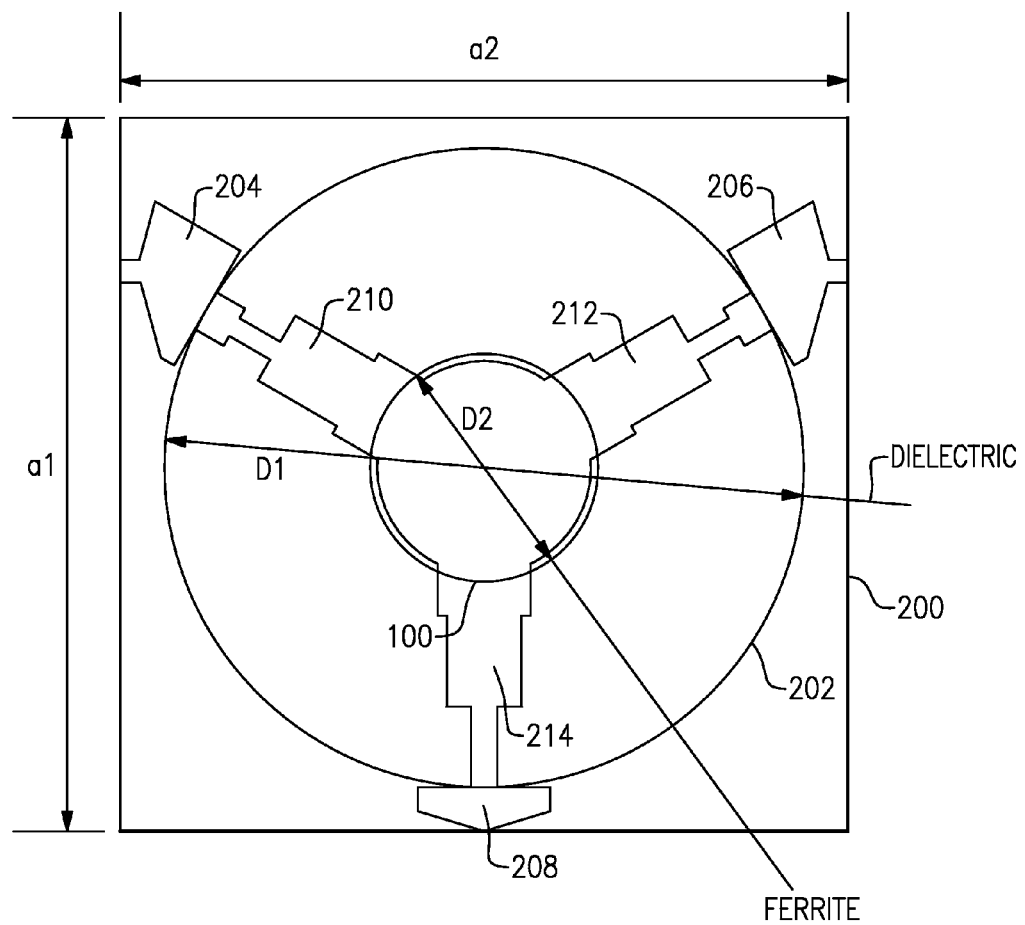
FIG. 8 shows an example of how a circulator can be implemented in a compact form to operate in below-resonance region with high bandwidth by utilizing one or more features as described herein.

FIG. 8 shows a plan view of a circulator device 200 that can be configured to benefit from one or more features as described herein. The example circulator 200 is described in the context of three ports 204, 206, 208. However, it will be understood that circulators can have other numbers of ports. The ports 204, 206, 208 are shown to be coupled to a junction through their respective stripline transmission lines 210, 212, 214. A dielectric body 202 (e.g., having a diameter D1) about the stripline transmission lines 210, 212, 214 can be configured to provide a desired impedance transformation functionality. As described herein, such a dielectric body having a relatively high dielectric constant (e.g., 30 to 50) can be utilized so as to reduce the diameter dimension D1.

In some embodiments, a ferrite disk 100 having one or more features as described herein can be positioned at the junction to provide desired circulator functionalities. As described herein, such a ferrite disk can be configured to include a number of desirable features, including a reduced diameter dimension D2. Combined with the foregoing configuration of the impedance transformers associated with the three ports, the resulting circulator device 200 can have a reduced dimension (e.g., in a rectangular form with dimensions a1 and a2) while being configured to operate in, for example, below-resonance operation.

Figure 9:
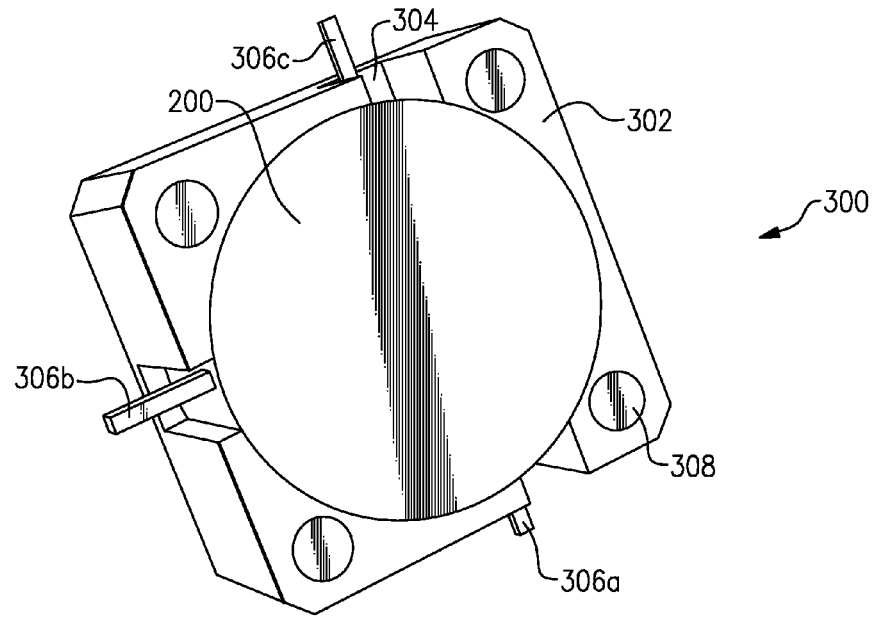
FIG. 9 shows an example of a packaged circulator module.

In some embodiments, ferrite-based circulator devices having one or more features as described herein can be implemented as a packaged modular device. FIG. 9 shows an example packaged device 300 having a circulator device 200 mounted on a packaging platform 304 and enclosed by a housing structure 302. The example platform 304 is depicted as including a plurality of holes 308 dimensioned to allow mounting of the packaged device 300. The example packaged device 300 is shown further include example terminals 306a-306c configured to facilitate electrical connections.

In some embodiments, a packaged circulator/isolator such as the example of FIG. 9 can be implemented in a circuit board or a module. Such a circuit board can include a plurality of circuits configured to perform one or more radio-frequency (RF) related operations. The circuit board can also include a number of connection features configured to allow transfer of RF signals and power between the circuit board and components external to the circuit board.

Figure 10:
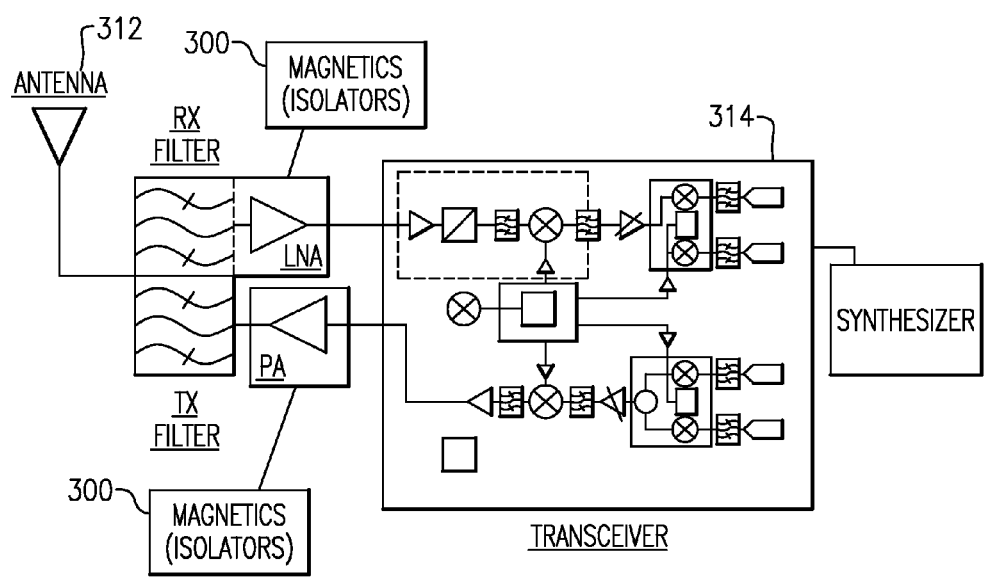
FIG. 10 shows an example radio-frequency (RF) system where one or more of circulator/isolator devices as described herein can be implemented.

In some embodiments, the foregoing example circuit board can include RF circuits associated with a front-end module of an RF apparatus. As shown in FIG. 10, such an RF apparatus can include an antenna 312 that is configured to facilitate transmission and/or reception of RF signals. Such signals can be generated by and/or processed by a transceiver 314. For transmission, the transceiver 314 can generate a transmit signal that is amplified by a power amplifier (PA) and filtered (Tx Filter) for transmission by the antenna 312. For reception, a signal received from the antenna 312 can be filtered (Rx Filter) and amplified by a low-noise amplifier (LNA) before being passed on to the transceiver 314. In the example context of such Tx and Rx paths, circulators and/or isolators 300 having one or more features as described herein can be implemented at or in connection with, for example, the PA circuit and the LNA circuit.

In some embodiments, circuits and devices having one or more features as described herein can be implemented in RF applications such as a wireless base-station. Such a wireless base-station can include one or more antennas 312, such as the example described in reference to FIG. 10, configured to facilitate transmission and/or reception of RF signals. Such antenna(s) can be coupled to circuits and devices having one or more circulators/isolators as described herein. Although described in the context of a wireless base-station, it will be understood that one or more features of the present disclosure can also be implemented in portable wireless devices.

In some embodiments, such portable wireless devices can have an architecture similar to the example of FIG. 10.

As described herein, terms "circulator" and "isolator" can be used interchangeably or separately, depending on applications as generally understood. For example, circulators can be passive devices utilized in RF applications to selectively route RF signals between an antenna, a transmitter, and a receiver. If a signal is being routed between the transmitter and the antenna, the receiver preferably should be isolated. Accordingly, such a circulator is sometimes also referred to as an isolator; and such an isolating performance can represent the performance of the circulator.

Figure 11:
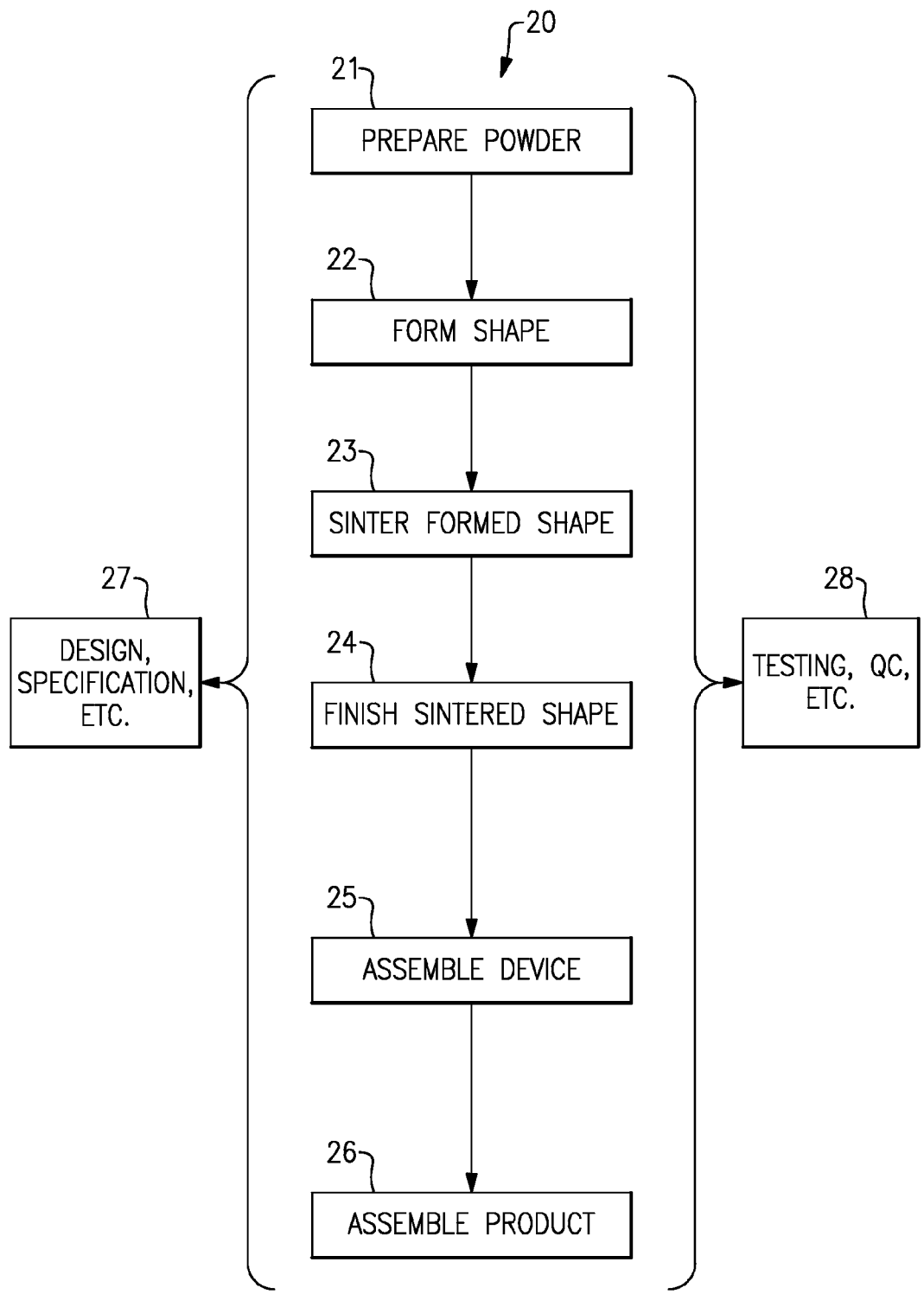
FIG. 11 shows a process that can be implemented to fabricate a ferrite material having one or more features as described herein.

FIGS. 11-16 show examples of how ferrite devices having one or more features as described herein can be fabricated. FIG. 11 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 11 further shows that some or all of the steps of the example process 20 can be based on a design, specification, etc. as depicted by block 27. Similarly, some or all of the steps can include or be subjected to testing, quality control, etc. as depicted by block 28.

Figure 12:
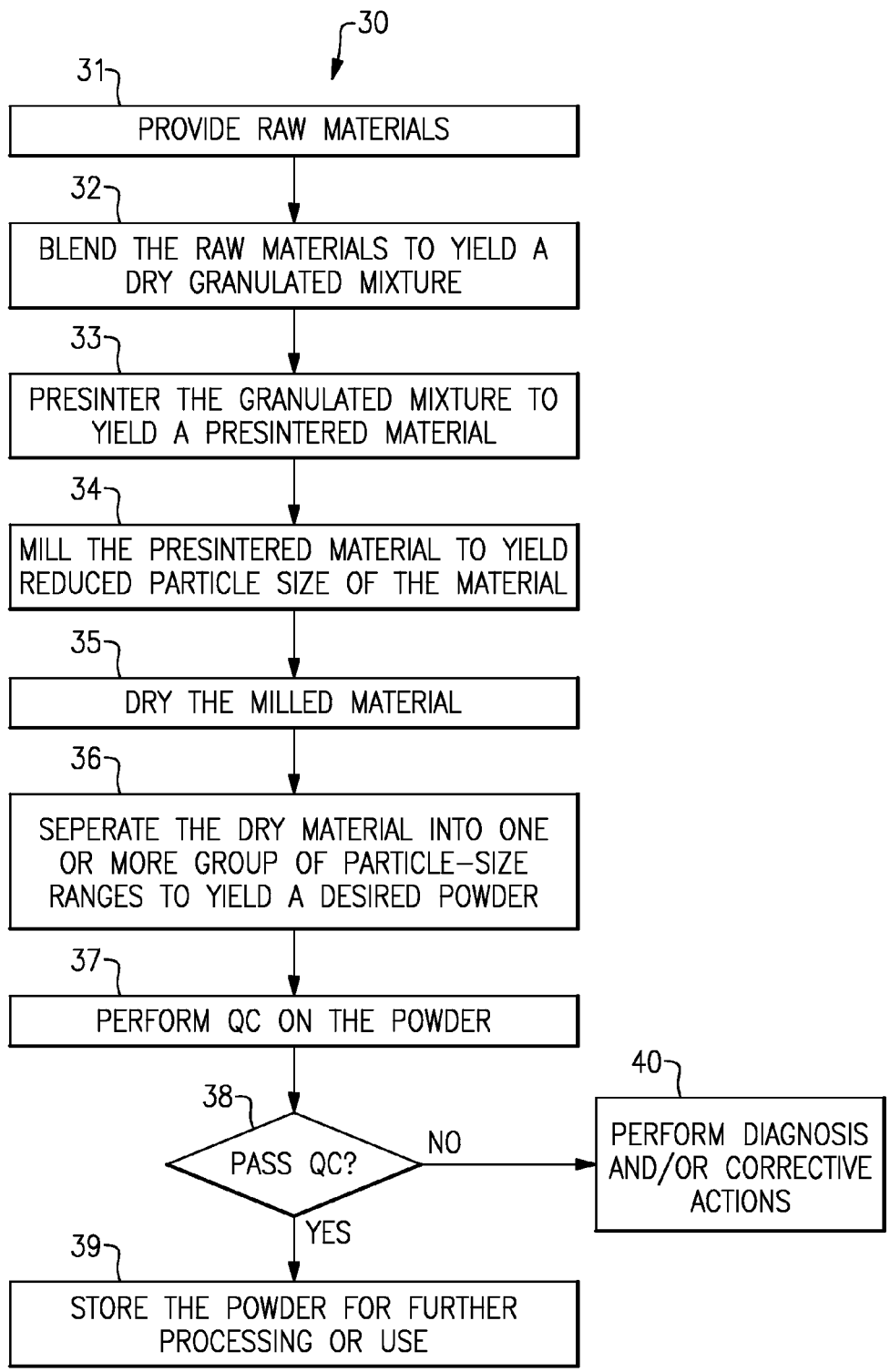
FIG. 12 shows a process that can be implemented to form a powder for the fabrication of the ferrite material of FIG. 11.

FIG. 12 shows a process 30 that can be implemented to prepare a powder (e.g., block 21 in FIG. 11) having one or more features described herein. Such a powder can be used as is, or can be formed into desired shapes as described herein. In block 31 raw materials can be provided. Such raw materials can be selected to yield one or more desired properties of the prepared powder, an object formed from such a powder, and/or a ceramic object resulting from sintering of such a formed object.

In block 32, the raw materials can be blended to yield a dry granulated mixture. Such blending can be achieved in a number of ways. For example, an Eirich blending method or a Cowles blending method can be utilized.

In block 33, the granulated mixture can be pre-sintered to yield a pre-sintered material. For the purpose of description, it will be understood that such pre-sintering can include implementations where such pre-sintered material will be formed into shapes for another sintering process. In implementations where such pre-sintered material will not be formed into shapes, or where shapes formed from such pre-sintered material will not undergo another sintering process, the pre-sintering of the granulated mixture can be configured so that the resulting material has one or more desired properties as described herein.

In block 34, the pre-sintered material can be milled to yield reduced particle size of the pre-sintered material. Such a milling process can yield refined and regulated particles from the pre-sintered material.

In block 35, the milled material can be dried. In some implementations, such a drying process can include a spray drying process. In some implementations, the spray-drying process can be used to produce free-flowing powder suitable for a forming process. Milled material as described herein can be mixed with a binder material in a tank to form a slurry. The resulting mixture can be poured through a fine meshed screen to separate oversized particles from usable particles. Next, the screened slurry can be pumped into a dryer chamber through a pipe and a nozzle at or near the bottom of the chamber, creating a fountain-like spray. Formation of flowable powder can occur through the action of downward-flowing heated air meeting the upward spray of the slurry in the dryer chamber and forming small spherical dry particles. More coarse particles can drop to a lower collection chamber, and finer particles can be collected in an upper cyclone collection chamber. In some implementations, size of the spray dried particles can be adjusted by exchanging the orifice size of the nozzle and controlling the feed-air flow ratio. After spray-drying in the foregoing manner, the dried powder can be collected for screening.

In block 36, the spray-dried powder material can be separated into one or more groups of particle-size ranges to yield one or more powders having desired ranges of particle sizes. In some implementations, such a separation process can be achieved by a separator such as a vibro-energy separator. Separation of spray-dried material into different groups of comparable sizes in the foregoing manner can allow collection of particles having sizes in a desired range.

In block 37, a quality-control (QC) test can be performed on a selected group of spray-dried powder (e.g., a group having particle sizes in a desired range). If the QC test is passed in a decision block 38, the process 30 can proceed to block 39 where the powder can be stored for further processing or use. If the QC test is failed, the process 30 can proceed to block 40 where one or more diagnosis and/or corrective actions can be performed.

In some implementations, powder prepared as described herein can be formed into different shapes by different forming techniques. By way of examples, FIG. 13 shows a process 50 that can be implemented to press-form a shaped object from a powder material prepared as described herein. In block 52, a shaped die can be filled with a desired amount of the powder. In FIG. 14, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

Figure 15:
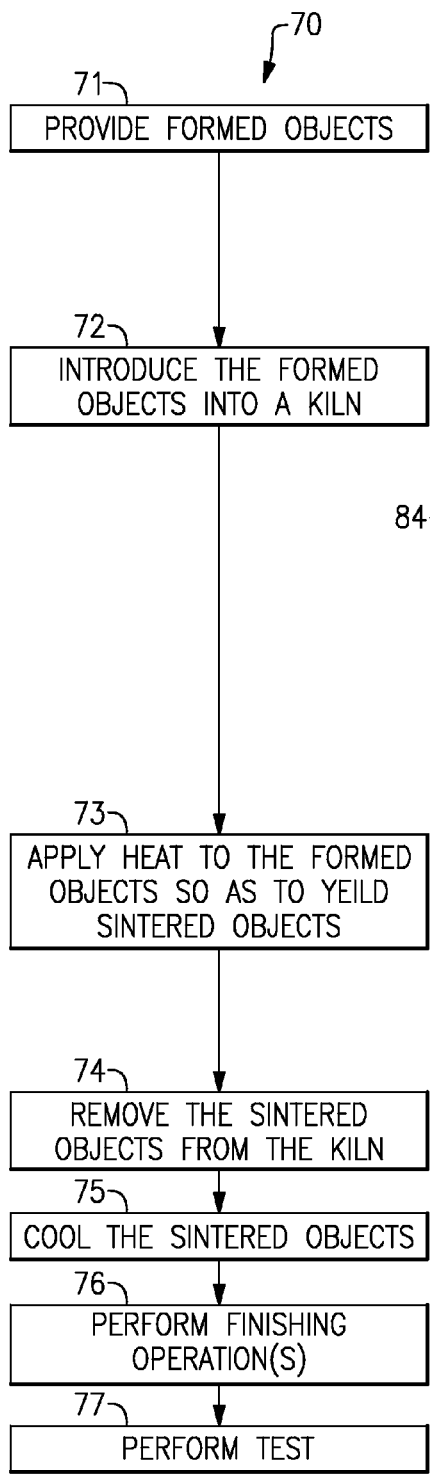
FIG. 15 shows a process that can be implemented to sinter formed objects such as those formed in the example of FIGS. 13 and 14.
Figure 16:
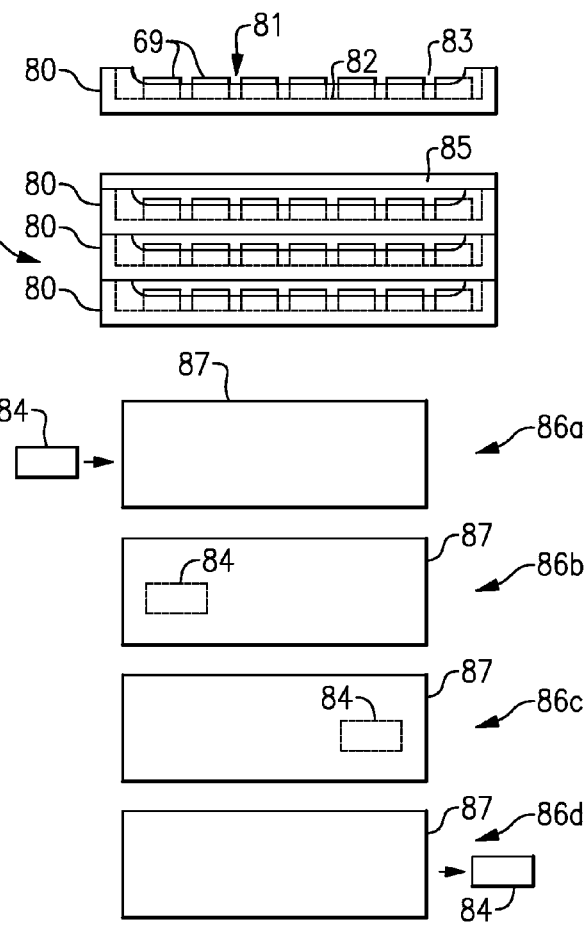
FIG. 16 shows examples of various stages of the process of FIG. 15.

In some implementations, formed objects fabricated as described herein can be sintered to yield desirable physical properties as ceramic devices. FIG. 15 shows a process 70 that can be implemented to sinter such formed objects. In block 71, formed objects can be provided. In block 72, the formed objects can be introduced into a kiln. In FIG. 16, a plurality of formed objects 69 are shown to be loaded into a sintering tray 80. The example tray 80 is shown to define a recess 81 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 81, even when the trays are stacked together. FIG. 16 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 16, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 76, the cooled objects can undergo one or more finishing operations. In block 77, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A synthetic garnet material comprising a structure represented by the formula $Y_{3-x-2y-z}Bi_xCa_{2y+z}Fe_{5-y-z-a}V_yZr_zAl_aO_{12}$, bismuth occupying x formula units of dodecahedral sites, zirconium occupying z formula units of octahedral sites, vanadium occupying y formula units of tetrahedral sites, calcium occupying 2y+z formula units of the dodecahedral sites to compensate for a valency imbalance resulting from the presence of zirconium and vanadium, aluminum occupying a formula units of the tetrahedral sites while having the octahedral sites substantially free of aluminum, the quantity a being greater than zero, such that saturation magnetization of the material decreases in a substantially linear manner as the quantity a increases to an upper limit value of at least 0.6.

2. The material of claim 1 wherein the quantity x is selected to provide a desired increase in dielectric constant of the material, the quantity z is selected to provide a desired reduction in a 3-db ferrimagnetic resonance linewidth of the material, and the quantity y is selected to provide either or both of a reduction in the saturation magnetization and a reduction in the 3-db ferrimagnetic resonance linewidth of the material.

3. The material of claim 1 wherein the material has a dielectric constant value that is at least 25.

4. The material of claim 1 wherein the material has a 3-db ferrimagnetic resonance linewidth value that is less than 50 Oersted.

5. The material of claim 1 wherein the material has a saturation magnetization value in a range of 400 to 1000 Gauss.

6. The material of claim 1 wherein the quantity x is greater than zero and less than or equal to 1.4.

7. The material of claim 1 wherein the quantity y is greater than zero and less than or equal to 0.7.

8. The material of claim 1 wherein the quantity z is greater than zero and less than or equal to 0.7.

9. The material of claim 1 wherein the upper limit value of the quantity a is less than or equal to 0.75.

10. A method for fabricating synthetic garnet material having dodecahedral sites, octahedral sites, and tetrahedral sites, the method comprising:
   introducing bismuth into at least some of the dodecahedral sites; and
   introducing aluminum into at least some of the tetrahedral sites to result in a composition represented by the formula $Y_{3-x-2y-z}Bi_xCa_{2y+z}Fe_{5-y-z-a}V_yZr_zAl_aO_{12}$, such that aluminum occupies a formula units of the tetrahedral sites while having the octahedral sites substantially free of aluminum, the quantity a being greater than zero, such that saturation magnetization of the material decreases in a substantially linear manner as the quantity a increases to an upper limit value of at least 0.6.

11. A circulator, comprising:
   a conductor having a plurality of signal ports;
   one or more magnets configured to provide a magnetic field; and
   one or more ferrite disks implemented relative to the conductor and the one or more magnets so that a radio-frequency (RF) signal is routed selectively among the signal ports due to the magnetic field, each of the one or more ferrite disks including a synthetic garnet material having a structure represented by the formula $Y_{3-x-2y-z}Bi_xCa_{2y+z}Fe_{5-y-z-a}V_yZr_zAl_aO_{12}$, bismuth occupying x formula units of dodecahedral sites, zirconium occupying z formula units of octahedral sites, vanadium occupying y formula units of tetrahedral sites, calcium occupying 2y+z formula units of the dodecahedral sites to compensate for a valency imbalance resulting from the presence of zirconium and vanadium, aluminum occupying a formula units of the tetrahedral sites while having the octahedral sites substantially free of aluminum, the quantity a being greater than zero, such that saturation magnetization of the material decreases in a substantially linear manner as the quantity a increases to an upper limit value of at least 0.6.

12. The circulator of claim 11 wherein the conductor includes a plurality of impedance transformers corresponding to the plurality of signal ports, each impedance transformer including a stripline transmission line.

13. The circulator of claim 12 further comprising a dielectric body implemented about the stripline transmission lines, the dielectric body having a dielectric constant, each stripline transmission line having a physical length that is proportional to one over the square root of the dielectric constant of the dielectric body.

14. The circulator of claim 13 wherein the dielectric body has a dielectric constant in a range of 30 to 50.

15. The circulator of claim 11 wherein each ferrite disk has a dielectric constant value that is at least 25.

16. The circulator of claim 15 wherein each ferrite disk has a 3-db ferrimagnetic resonance linewidth value that is less than 50 Oersted.

17. The circulator of claim 16 wherein each ferrite disk has a saturation magnetization value in a range of 400 to 1000 Gauss.

18. The circulator of claim 17 wherein the circulator is a below-resonance device.

19. The circulator of claim 18 wherein the circulator is an octave bandwidth device.

* * * * *